US008897984B2

(12) United States Patent
Ito

(10) Patent No.: US 8,897,984 B2
(45) Date of Patent: Nov. 25, 2014

(54) BRAKING FORCE GENERATOR

(71) Applicant: Honda Motor Co., Ltd., Tokyo (JP)

(72) Inventor: Yuki Ito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 4 days.

(21) Appl. No.: 13/940,728

(22) Filed: Jul. 12, 2013

(65) Prior Publication Data

US 2014/0025272 A1    Jan. 23, 2014

(30) Foreign Application Priority Data

Jul. 17, 2012  (JP) ................................. 2012-158338

(51) Int. Cl.

| B60T 13/66 | (2006.01) |
|---|---|
| B60T 13/68 | (2006.01) |
| B60T 7/04 | (2006.01) |
| B60T 7/12 | (2006.01) |
| B60T 13/14 | (2006.01) |
| B60T 13/74 | (2006.01) |

(52) U.S. Cl.
CPC ............. *B60T 7/12* (2013.01); *B60T 2270/404* (2013.01); *B60T 2270/82* (2013.01); *B60T 7/042* (2013.01); *B60T 13/142* (2013.01); *B60T 13/662* (2013.01); *B60T 13/745* (2013.01)
USPC .......................................... 701/70; 701/34.4

(58) Field of Classification Search
CPC ... B60T 13/142; B60T 13/662; B60T 13/745; B60T 7/042; B60T 7/12; B60T 2270/82; B60T 2270/404
See application file for complete search history.

(56) References Cited

U.S. PATENT DOCUMENTS

| 5,962,931 | A | 10/1999 | Maron et al. |
|---|---|---|---|
| 6,325,471 | B1 * | 12/2001 | Curran et al. ................. 303/155 |
| 7,347,510 | B2 * | 3/2008 | Schluter ..................... 303/114.1 |
| 2009/0064742 | A1 * | 3/2009 | Murakami et al. .............. 70/252 |
| 2013/0147259 | A1 * | 6/2013 | Linkenbach et al. ........... 303/14 |

FOREIGN PATENT DOCUMENTS

| DE | 196 38 759 A1 | 4/1998 |
|---|---|---|
| EP | 1 953 053 A1 | 8/2008 |
| JP | 4801823 B2 | 10/2011 |
| WO | WO2012/028521 A1 * | 3/2012 |

OTHER PUBLICATIONS

German Search Report dated Jan. 21, 2014 issued in the corresponding German patent application 10 2013 213 884.9.

* cited by examiner

*Primary Examiner* — Michael J Zanelli
(74) *Attorney, Agent, or Firm* — Carrier Blackman & Associates, P.C.; Joseph P. Carrier; William D. Blackman

(57) ABSTRACT

The object of the present invention is to provide a braking force generator capable of preventing a braking force from varying, even if an ON signal of an IG switch is not transmitted. The braking force generator includes a hydraulic pressure generation unit that becomes in an operation state according to an ON state of the IG switch of a vehicle or an opening and closing operation of an opening and closing member of the vehicle and generates a braking force according to an electrical signal based on an operation amount of a driver, and a conditional stop unit that puts the hydraulic pressure generation unit in an operation stop state if an OFF state of the IG switch continues for a predetermined time after the hydraulic pressure generation unit becomes in the operation state according to the opening and closing operation of the opening and closing member.

2 Claims, 4 Drawing Sheets

BRAKING FORCE GENERATOR

CROSS REFERENCE TO RELATED APPLICATIONS

This application claims the foreign priority benefit under Title 35, United States Code, 119 (a)-(d) of Japanese Patent Application No. 2012-158338, filed on Jul. 17, 2012 in the Japan Patent Office, the disclosure of which is herein incorporated by reference in its entirety.

TECHNICAL FIELD

The present invention relates to a braking force generator that generates a braking force according to an electrical signal based on an operation amount of a driver.

BACKGROUND ART

According to the braking force generator, it is not necessary to exert a force which is generated by the driver directly as the braking force of a vehicle, and it is possible to realize a so-called brake-by-wire (BBW) system (for example, see Patent Document 1).

CITATION LIST

Patent Literature

{Patent Document 1}
Japanese Patent No. 4801823

SUMMARY OF INVENTION

Technical Problem

Usually, when starting the vehicle by turning on an ignition (IG) switch, the driver does so while stepping on a brake pedal. When turning on the IG switch, there have been cases that a reaction force of the brake pedal is reduced temporarily. This is because the braking force generator is started along with turning on the IG switch. In other words, when starting the braking force generator, a PFSV (Pedal Force Solenoid Valve) is opened and a brake fluid with a hydraulic pressure which has been raised by depressing the brake pedal flows into a stroke simulator via the opened PFSV, and the reaction force of the brake pedal is temporarily reduced. Therefore, as a countermeasure therefor, the braking force generator is started before turning on the IG switch. Since turning on the IG switch is performed by the driver who got on the vehicle, the start of the braking force generator can be performed along with an opening and closing operation of a door for the driver getting on the vehicle (hereinafter, referred to as a door start). If a door switch is provided on the door, it is possible to detect a timing of the opening and closing operation of the door, thereby starting the braking force generator at the timing.

However, there may be a case in which the driver does not get on the vehicle and does not turn on the IG switch, just with the opening and closing operation of the door. Even in this case, since the braking force generator is started by the opening and closing operation of the door, it is unreasonable that the braking force generator remains in an operation state. Therefore, if the IG switch is not turned on within a predetermined time limit from the opening and closing operation of the door (start of the braking force generator), the braking force generator stops (shuts down) itself. On the other hand, if the IG switch is turned on within the time limit, an IG voltage monitor value or the like at the time of turning on the IG switch is transmitted as an ON signal to an ECU of the braking force generator, and the ECU of the braking force generator cancels a shutdown of itself based on the ON signal.

Here, a case is assumed in which the ON signal is not transmitted to the ECU of the braking force generator due to a disconnection of a signal line or the like, although the IG switch is turned on within the time limit from the door start. In this case, since the ON signal is not transmitted in spite of the vehicle start by turning on the IG switch, the ECU of the braking force generator shuts down itself after the time limit. When the braking force generator shuts down itself, the braking force generator does not generate the braking force applied to wheel cylinders, but the braking force generated by depressing the brake pedal by the driver comes to be applied to the wheel cylinders. Since a generation source of the braking force is switched and the braking force is varied at the timing of the shutdown, it seems that the driver feels uncomfortable.

Therefore, the object of the present invention is to provide a braking force generator capable of preventing the braking force from varying, even if the ON signal of the IG switch is not transmitted.

Solution to Problem

One aspect of the present invention is a braking force generator including a hydraulic pressure generation unit that becomes in an operation state according to an ON state of an ignition (IG) switch of a vehicle or an opening and closing operation of an opening and closing member (door) of the vehicle, and generates a braking force according to an electrical signal based on an operation amount of a driver, and a conditional stop unit that puts (shuts down) the hydraulic pressure generation unit in an operation stop state if an OFF state of the ignition switch continues for a predetermined time (the time limit) after the hydraulic pressure generation unit becomes in the operation state according to the opening and closing operation, wherein the conditional stop unit puts the hydraulic pressure generation unit in the operation stop state if it is determined that the ON state cannot be obtained, even if the opening and closing operation is obtained.

According to this aspect, even if the hydraulic pressure generation unit is activated once to be in the operation state (door start) according to the opening and closing of the opening and closing member (door), if it is determined that the ON state of the IG switch cannot be obtained as the ON signal due to the disconnection or the like of the signal line, the hydraulic pressure generation unit can be put (shut down) in an operation stop state, and thereby it is possible to practically cancel the door start. According to this aspect, the hydraulic pressure generation unit is activated to be in the operation state according to the ON state of the IG switch. If the hydraulic pressure generation unit is activated according to the ON state of the IG switch, the hydraulic pressure generation unit is not shut down after the predetermined time (time limit), and it is possible to prevent the braking force from varying.

Another aspect of the present invention is a braking force generator including a hydraulic pressure generation unit that becomes in an operation state according to an ON state of an ignition (IG) switch of a vehicle or an opening and closing operation of an opening and closing member (door) of the vehicle, and generates a braking force according to an electrical signal based on an operation amount of a driver, and a conditional stop unit that puts (shuts down) the hydraulic pressure generation unit in an operation stop state if an OFF state of the ignition switch continues for a predetermined time (the time limit) after the hydraulic pressure generation unit becomes in the operation state according to the opening and closing operation, wherein the conditional stop unit continues the operation state of the hydraulic pressure generation unit if it is determined that the ON state cannot be obtained, even if the OFF state of the ignition switch continues for a predetermined time after the hydraulic pressure generation unit becomes in the operation state according to the opening and closing operation.

According to this aspect, if it is determined that the ON state of the IG switch cannot be obtained as the ON signal due to the disconnection or the like of the signal line, the hydraulic pressure generation unit maintains the operation state not to be shut down even if the predetermined time (time limit) elapses after the door start, and thereby it is possible to prevent the braking force from varying.

Advantageous Effects of Invention

According to the present invention, it is possible to provide a braking force generator capable of preventing the braking force from varying, even if the ON signal of the IG switch is not transmitted.

DESCRIPTION OF EMBODIMENTS

Figure 1:
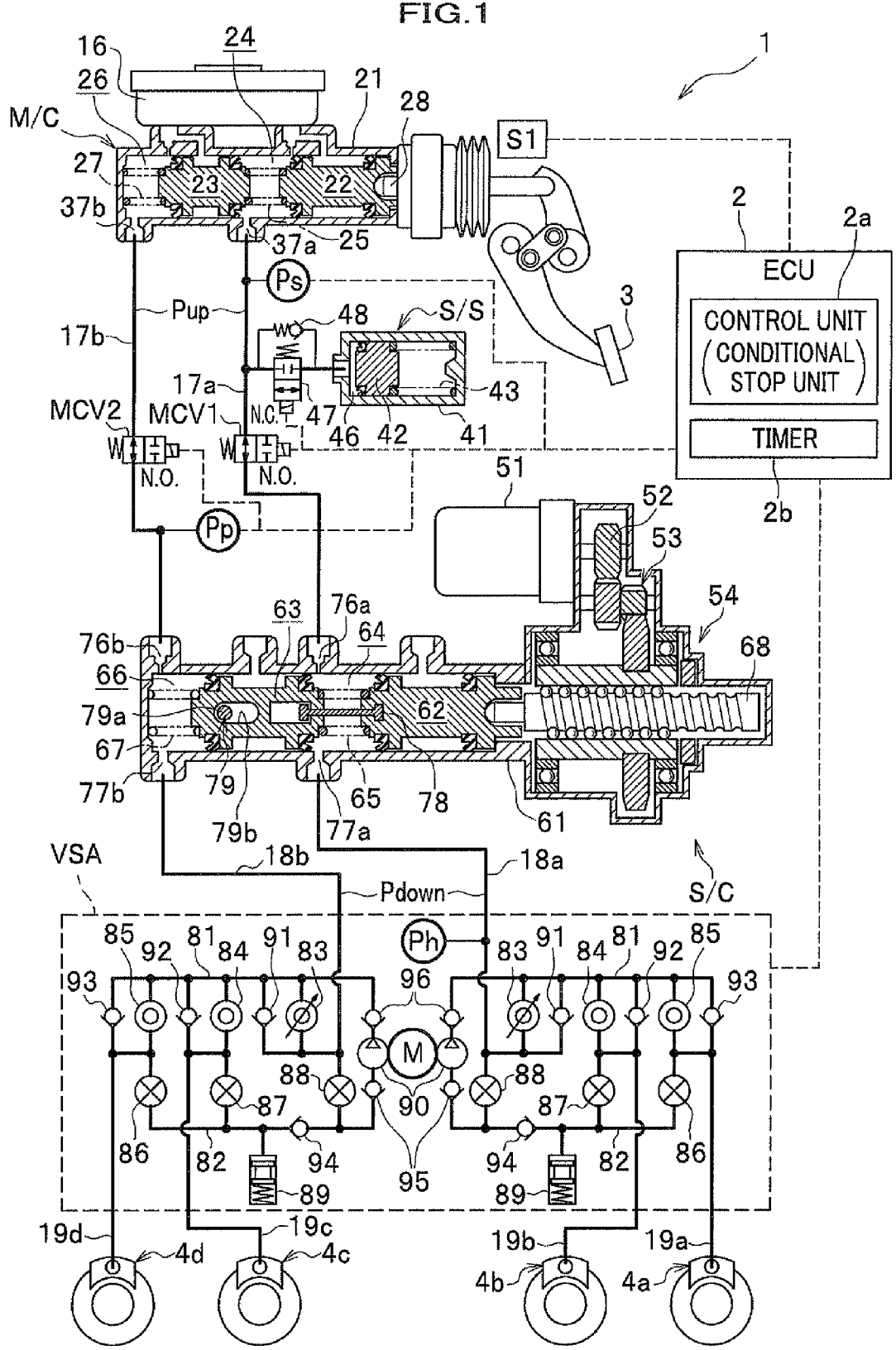
FIG. 1 is a block diagram of a braking force generator according to a first embodiment of the present invention.

Next, the embodiments of the present invention will be described in detail with reference to accompanying drawings. In each drawing, the same reference numeral is assigned to the same component, and duplicated descriptions will be omitted.

First Embodiment

FIG. 1 shows a block diagram of a braking force generator according to a first embodiment of the present invention. A braking force generator 1 includes a brake pedal 3, wheel cylinders 4a, 4b, 4c, 4d, a tandem master cylinder M/C capable of generating a hydraulic pressure by an operation of a brake pedal 3 by a driver, hydraulic pressure passages 17a-18a-19a, 17a-18a-19b of a first hydraulic pressure system connecting a first hydraulic pressure chamber 24 of the master cylinder M/C and the plurality of wheel cylinders 4a, 4b, and hydraulic pressure passages 17b-18b-19c, 17b-18b-19d of a second hydraulic pressure system connecting a second hydraulic pressure chamber 26 of the master cylinder M/C and the plurality of wheel cylinders 4c, 4d.

The master cylinder M/C includes a first piston 22 and a second piston 23 which are slidably fitted to a cylinder 21, and further includes a first return spring 25 disposed in the first hydraulic pressure chamber 24 which is partitioned in front of the first piston 22, and a second return spring 27 disposed in the second hydraulic pressure chamber 26 which is partitioned in front of the second piston 23. A rear end of the first piston 22 is connected to the brake pedal 3 via a push rod 28, and when the brake pedal 3 is depressed by the driver, the first piston 22 and the second piston 23 moves forward, and an upstream hydraulic pressure Pup is generated in the first hydraulic pressure chamber 24 and the second hydraulic pressure chamber 26. The cylinder 21 is communicated with a reservoir 16. The hydraulic pressure passage (first hydraulic pressure system) 17a is connected to an output port 37a. The hydraulic pressure passage (second hydraulic pressure system) 17b is connected to an output port 37b.

In addition, the braking force generator 1 includes a slave cylinder (hydraulic pressure generation unit) S/C. The slave cylinder S/C is disposed between the hydraulic pressure passages 17a and 18a of the first hydraulic pressure system and between the hydraulic pressure passages 17b and 18b of the second pressure system. The slave cylinder S/C is capable of generating downstream hydraulic pressures Pdown of the hydraulic pressure passage 18a of the first hydraulic pressure system and the hydraulic pressure passage 18b of the second hydraulic pressure system based on an operation amount of the brake pedal 3. A control unit (conditional stop unit) 2a of an ECU 2 sets a target value of the downstream hydraulic pressure Pdown based on the operation amount of the brake pedal 3 (measured by a stroke sensor S1), and controls the downstream hydraulic pressure Pdown based on the target value. The target value is set based on a distribution ratio of a regenerative braking force by a regenerative braking and a hydraulic pressure braking force by the wheel cylinders 4a, 4b, 4c, and 4d. The braking force generator 1 determines the operation amount (rotation amount) from the target value based on a correspondence relationship between the target value of the downstream hydraulic pressure Pdown and the operation amount (rotation amount of a motor 51) of a first piston 62 and a second piston 63 of the slave cylinder S/C, and generates the downstream hydraulic pressure Pdown based on the determined operation amount (rotation amount). Incidentally, the ECU 2 has a timer 2b, however, the explanation will be describes later. The slave cylinder S/C includes the first piston (slave piston) 62 and the second piston (slave piston) 63 which are slidably fitted to a cylinder 61, and a first return spring 65 is disposed in a first hydraulic pressure chamber 64 which is partitioned in front of the first piston 62 and the second return spring 67 is disposed in a second hydraulic pressure chamber 66 which is partitioned in front of the second piston 63. Rear end of the first piston 62 is connected to the motor 51 via a push rod 68, a ball screw mechanism 54, a deceleration mechanism 53, and a gear 52. In the slave cylinder S/C, the motor 51 rotates so that the push rod 68 and the first piston 62, the second piston 63 (slave pistons) move forward (are driven), and the downstream pressure Pdown is generated in the first hydraulic pressure chamber 64 and the second hydraulic pressure chamber 66. Note that a regulation unit 78 regulates minimum and maximum distances between the first piston 62 and the second piston 63. In addition, a regulation unit 79 includes a long hole 79b which is formed in the second piston 63 and a pin 79a which is secured to the inner wall of the cylinder 61 and engaged with the long hole 79b. Thus, the regulation unit 79 regulates a movement range of the second piston 63.

The cylinder 61 has a first input port 76a open to the first hydraulic pressure chamber 64, a first output port 77a open to the first hydraulic pressure chamber 64, a second input port 76b open to the second hydraulic pressure chamber 66, and a second output port 77b open to the second hydraulic pressure chamber 66, which are formed from the rear to the front thereof. The first input port 76a is connected to communicate with the hydraulic pressure passage (first hydraulic pressure system) 17a. The second input port 76b is connected to communicate with the hydraulic pressure passage (second hydraulic pressure system) 17b. The first input port 76a is connected to the first hydraulic pressure chamber 24 of the master cylinder M/C through a master cut valve MCV1 capable of blocking the connection. The second input port 76b is connected to the second hydraulic pressure chamber 26 of the master cylinder M/C through a master cut valve MCV2 capable of blocking the connection. The first output port 77a is connected to communicate with the hydraulic pressure passage (first hydraulic pressure system) 18a. The second output port 77b is connected to communicate with the hydraulic pressure passage (second hydraulic pressure system) 18b. The first output port 77a is disposed in the vicinity of the first input port 76a in the axial direction of the cylinder 61. In this way, the upstream hydraulic pressure Pup transmitted from the first input port 76a can be transmitted without generating a transmission loss to the first output port 77a as the downstream hydraulic pressure Pdown, in the operation stop state during a shutdown of the braking force generator 1. Similarly, the second output port 77b is disposed in the vicinity of the second input port 76b in the axial direction of the cylinder 61. In this way, the upstream hydraulic pressure Pup transmitted from the second input port 76b can be transmitted without generating a transmission loss to the second output port 77b as the downstream hydraulic pressure Pdown, in the operation stop state during the shutdown of the braking force generator 1.

In addition, the braking force generator 1 includes a vehicle stability assist VSA (registered trademark). The vehicle stability assist VSA is disposed between the slave cylinder S/C and the wheel cylinders 4a, 4b, 4c, 4d, and further between the hydraulic pressure passage 18a and the hydraulic pressure passages 19a, 19b of the first hydraulic pressure system. In addition, the vehicle stability assist VSA is disposed between the hydraulic pressure passage 18b and the hydraulic pressure passages 19c, 19d of the second hydraulic pressure system. The vehicle stability assist VSA has a same structure between a structure of the first hydraulic pressure system from the hydraulic pressure passage 18a to the hydraulic pressure passages 19a, 19b and a structure of the second hydraulic pressure system from the hydraulic pressure passage 18b to the hydraulic pressure passages 19c, 19d. Therefore, the same members between the first hydraulic pressure system and the second hydraulic pressure system are denoted by the same reference numerals to facilitate understanding. In the following description, the first hydraulic pressure system from the hydraulic pressure passage 18a to the hydraulic pressure passages 19a, 19b will be described as an example.

The vehicle stability assist VSA includes hydraulic pressure passages 81, 82 common to the wheel cylinders 4a, 4b (4c, 4d), and further includes a regulator valve (normally open) 83, a check valve 91, an in-valve (normally open) 85, a check valve 93, an in-valve (normally open) 84, a check valve 92, an out-valve (normally closed) 86, an out-valve (normally closed) 87, a reservoir 89, a check valve 94, a pump 90, check valves 95, 96, a motor M, and a suction valve (normally closed) 88. The regulator valve (normally open) 83 is composed of a normally open solenoid valve of a variable opening degree which is disposed between the hydraulic pressure passage 18a (18b) and the hydraulic pressure passage 81. The check valve 91 is disposed in parallel with the regulator valve 83 and allows a brake fluid to flow from the hydraulic pressure passage 18a (18b) side to the hydraulic pressure passage 81 side. The in-valve (normally open) 85 is composed of a normally open solenoid valve which is disposed between the hydraulic pressure passage 81 and the hydraulic pressure passage 19a (19d). The check valve 93 is disposed in parallel with the in-valve 85 and allows the brake fluid to flow from the hydraulic pressure passage 19a (19d) side to the hydraulic pressure passage 81 side. The in-valve (normally open) 84 is composed of a normally open solenoid valve which is disposed between the hydraulic pressure passage 81 and the hydraulic pressure passage 19b (19c). The check valve 92 is disposed in parallel with the in-valve 84 and allows the brake fluid to flow from the hydraulic pressure passage 19b (19c) side to the hydraulic pressure passage 81 side. The out-valve (normally closed) 86 is composed of a normally closed solenoid valve which is disposed between the hydraulic pressure passage 19a (19d) and the hydraulic pressure passage 82. The out-valve (normally closed) 87 is composed of a normally closed solenoid valve which is disposed between the hydraulic pressure passage 19b (19c) and the hydraulic pressure passage 82. The reservoir 89 is connected to the hydraulic pressure passage 82. The check valve 94 is disposed between the hydraulic pressure passage 82 and the hydraulic pressure passage 81, and allows the brake fluid to flow from the hydraulic pressure passage 82 side to the hydraulic pressure passage 81 side. The pump 90 is disposed between the check valve 94 and the hydraulic pressure passage 81, and supplies the brake fluid from the hydraulic pressure passage 82 side to the hydraulic pressure passage 81 side. The check valves 95, 96 are disposed respectively before and after the pump 90, and allow the brake fluid to flow from the hydraulic pressure passage 82 side to the hydraulic pressure passage 81 side. The motor M drives the pump 90. The suction valve (normally closed) 88 is composed of a normally closed solenoid valve which is disposed between the hydraulic pressure passage 18a (18b) and the intermediate position between the check valve 94 and the check valve 95. A pressure sensor Ph for detecting the downstream pressure Pdown generated by the slave cylinder S/C is provided on the hydraulic pressure passage 18a beside the vehicle stability assist VSA.

In addition, the braking force generator 1 includes the master cut valves (shutoff valves: normally open (N.O.)) MCV1, MCV2. The master cut valve MCV1 is disposed on the hydraulic pressure passage 17a of the first hydraulic pressure system between the first hydraulic pressure chamber 24 of the master cylinder M/C and the first hydraulic pressure chamber (first slave fluid chamber) 64 of the slave cylinder S/C. The master cut valve MCV2 is disposed on the hydraulic pressure passage 17b of the second hydraulic pressure system between the second hydraulic pressure chamber 26 of the master cylinder M/C and the second hydraulic pressure chamber (second slave fluid chamber) 66 of the slave cylinder S/C.

The master cut valves MCV1, MCV2 are closed so as not to transmit the upstream hydraulic pressure Pup generated in the master cylinder M/C directly to the wheel cylinders 4a, 4b, 4c, 4d via the brake fluid, in the operation state of the braking force generator 1. The braking force generator 1 is operative to transmit the downstream hydraulic pressure Pdown generated electrically in the slave cylinder S/C based on the upstream hydraulic pressure Pup (operation amount of the brake pedal 3 by the driver) to the wheel cylinders 4a, 4b, 4c, 4d via the hydraulic pressure passages 18a, 18b, 19a, 19b, 19c, 19d, and operate the wheel cylinders. This operation mode is a so-called brake-by-wire (BBW) system. Note that the braking force generator 1 described above is capable of cooperative control with a regenerative braking device used in a vehicle such as an electric vehicle and a hybrid vehicle, and more specifically, capable of braking the vehicle without a feeling of discomfort to the driver by generating the downstream hydraulic pressure Pdown corresponding to a braking force obtained by subtracting a braking force by the regenerative braking from a braking force corresponding to the upstream hydraulic pressure Pup.

Further, in the operation stop state during the shutdown of the braking force generator 1, the master cut valves MCV1, MCV2 are opened so as to transmit the upstream hydraulic pressure Pup generated in the master cylinder M/C via the brake fluid directly to the wheel cylinders 4a, 4b, 4c, 4d and operate them, and thereby a concept of fail-safe is achieved.

The braking force generator 1 includes pressure sensors Pp and Ps. The pressure sensor Pp is disposed on the side of the wheel cylinders 4c, 4d relative to the master cut valve MCV2 on the hydraulic pressure passage 17b of the second hydraulic pressure system. The pressure sensor Pp is capable of detecting (measuring) the downstream hydraulic pressure Pdown on the side of the wheel cylinders 4c, 4d relative to the master cut valve MCV2 on the hydraulic pressure passage 17b of the second hydraulic pressure system. The pressure sensor Ps is disposed on the side of the master cylinder M/C relative to the master cut valve MCV1 on the hydraulic pressure passage 17a of the first hydraulic pressure system. The pressure sensor Ps is capable of detecting (measuring) the upstream hydraulic pressure Pup on the side of the master cylinder M/C relative to the master cut valve MCV1 on the hydraulic pressure passage 17a of the first hydraulic pressure system.

In addition, the braking force generator 1 includes a stroke simulator S/S. The stroke simulator S/S is disposed on the side of the master cylinder M/C relative to the master cut valve MCV1 on the hydraulic pressure passage 17a of the first hydraulic pressure system. The stroke simulator S/S is capable of absorbing the brake fluid transmitted from the first hydraulic pressure chamber 24 of the master cylinder M/C. In the stroke simulator S/S, a return spring 43 is disposed to urge a piston 42 so that a depression feeling of the brake pedal 3 is the same as a conventional depression feeling. A hydraulic pressure chamber 46 is partitioned on the opposite side of the return spring 43 of the piston 42 in the cylinder 41. The hydraulic pressure chamber 46 is connected to the hydraulic pressure passage (first hydraulic pressure system) 17a via a shutoff valve (PFSV, normally closed (N.C.)) 47. A check valve 48, which allows the brake fluid to flow from the hydraulic pressure chamber 46 to the hydraulic pressure passage (first hydraulic pressure system) 17a but does not allow to flow in the reverse direction, is connected in parallel with the shutoff valve (PFSV) 47.

While the master cut valve MCV1 is closed (in the operation state of the braking force generator 1), by opening the shutoff valve (PFSV) 47, when the brake pedal 3 is depressed, the brake fluid flowing from the first hydraulic pressure chamber 24 of the master cylinder M/C flows into the hydraulic pressure chamber 46, and thereby a reaction force of the brake pedal is generated so as not to give a feeling of discomfort to the driver. On the other hand, in the operation stop state during the shutdown of the braking force generator 1, the master cut valves MCV1, MCV2 are open and the shutoff valve (PFSV) 47 is closed, and when the brake pedal 3 is depressed, the brake fluid flowing from the first hydraulic pressure chamber 24 of the master cylinder M/C flows into the slave cylinder (hydraulic pressure source) S/C instead of the stroke simulator S/S, and the upstream hydraulic pressure Pup generated in the master cylinder M/C is transmitted to the slave cylinder (hydraulic pressure source) S/C and further to the wheel cylinders 4a, 4b, 4c, 4d and operates them.

Incidentally, at the time of the start of the braking force generator 1, if the driver does the start while depressing the brake pedal 3, the shutoff valve (PFSV) 47 is opened by the start, and the brake fluid with the hydraulic pressure raised by the depression of the brake pedal 3 flows into the stroke simulator S/S via the opened valve (PFSV) 47, thereby decreasing the reaction force of the brake pedal 3 temporarily.

Figure 2:
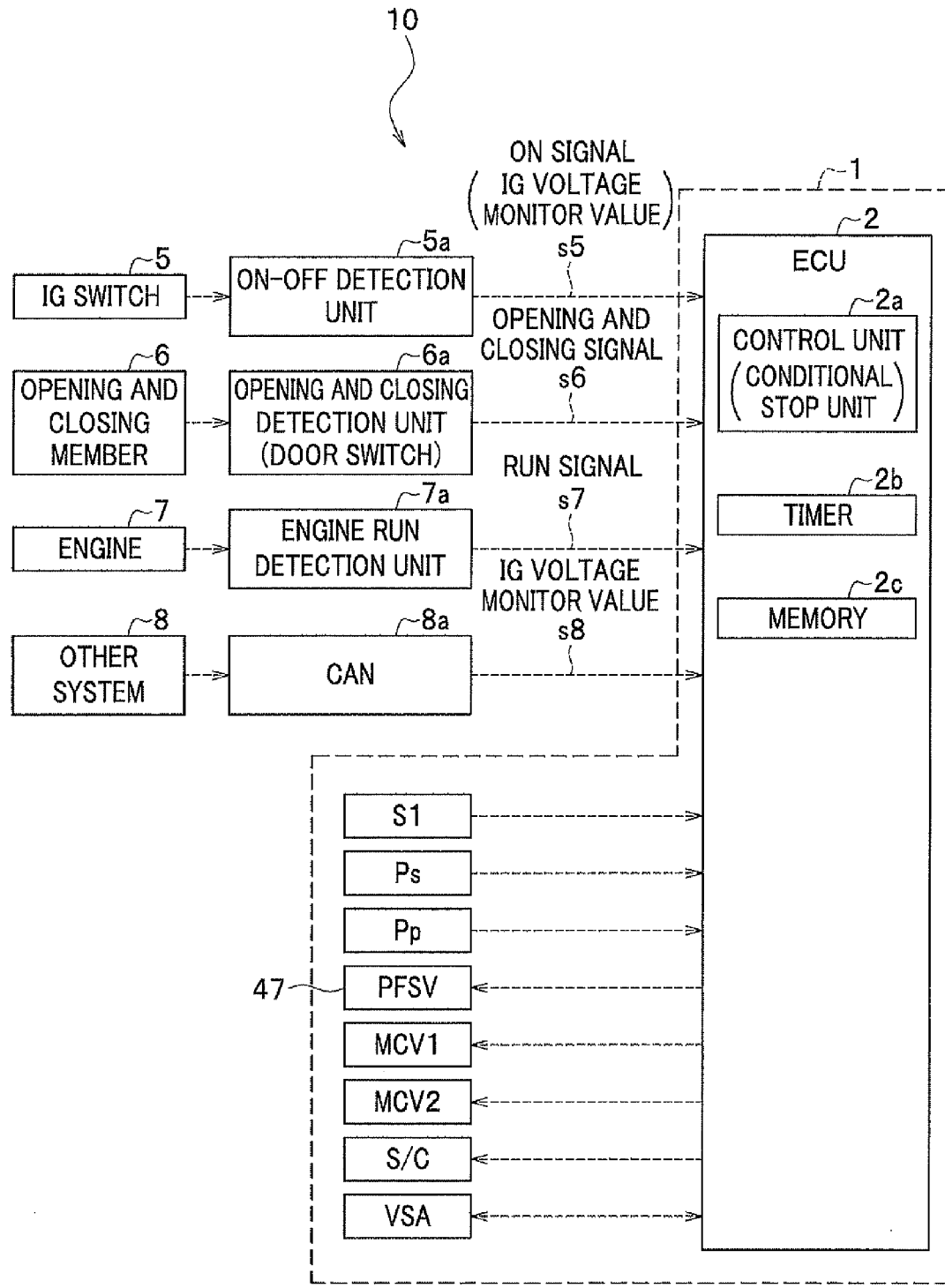
FIG. 2 is a block diagram of a vehicle equipped with the braking force generator according to the first embodiment of the present invention.

FIG. 2 shows a block diagram of a vehicle 10 equipped with the braking force generator 1 according to the first embodiment of the present invention. The vehicle 10 includes an IG switch 5, an opening and closing member (door) 6, an engine 7, the braking force generator 1, and other system 8. The IG switch 5 is turned on by the driver to be able to start the vehicle 10, i.e., the engine 7, the braking force generator 1, the other system 8, and the like, and put them in the operation state. In addition, the IG switch 5 is turned off by the driver to be able to shut down the vehicle 10, i.e., the engine 7, the braking force generator 1, the other system 8, and the like, and put them in the operation stop state. The vehicle 10 includes an on-off detection unit 5a, and the on-off detection unit 5a is capable of detecting an on-off state of the IG switch 5. There is a difference between an ON state and an OFF state of the IG switch 5 in a value of an IG voltage applied to IG switch 5 (specifically, a potential between terminals of the IG switch 5). For example, a monitor value of the IG voltage is not 0 V in the ON state, but is 0 V in the OFF state. Therefore, it is possible to detect the on-off state of the IG switch 5 by monitoring the value. It is sufficient for the on-off detection unit 5a to monitor an IG voltage value, and the IG voltage (monitor value) corresponding to the ON state of the IG switch 5 can be regarded as an ON signal s5. The ON signal s5 is transmitted to the ECU 2 of the braking force generator 1 from the on-off detection unit 5a. If there is a failure of the on-off detection unit 5a, a disconnection of a line between the on-off detection unit 5a and the ECU 2, or the like, there is no difference in the IG voltage monitor value between the ON state and the OFF state of the IG switch 5 (for example, the IG voltage monitor value is 0 V in the ON state and the OFF state), thereby erroneously detecting it is in the OFF state even if it is in the ON state. In addition, the slave cylinder S/C may be operated by detecting a state of the IG switch 5 directly from the engine (engine ECU) 7 or a state in which the vehicle speed is not zero. When the state of the IG switch 5 is detected directly from the vehicle speed or the engine ECU in this manner, an initial diagnosis of the slave cylinder S/C may be performed or prohibited.

The opening and closing member (door) 6 is provided to allow the driver to get on and off the vehicle 10 and is openable and closable. The vehicle 10 is provided with an opening and closing detection unit (door switch) 6a. The door switch 6a is capable of detecting an opening and closing state (opening and closing operation) of the door 6. Upon detecting the opening and closing operation, the door switch 6a transmits an opening and closing signal s6 to the ECU 2 of the braking force generator 1.

The engine 7 becomes in the operation state (run state) by turning on the IG switch 5, and becomes in the operation stop state by turning off to shut down the IG switch 5. Thus, a period of the run state of the engine 7 is substantially the same as a period of the ON state of the IG switch 5. If the ON signal s5 from the on-off detection unit 5a is not received (for example, the IG voltage monitor value is 0 V) in the ECU 2, it is possible to determine that the ON signal s5 cannot be received (obtained) in the ECU 2. The run state of the engine 7 can be detected by an engine run detection unit 7a. The engine run detection unit 7a transmits a run signal s7 to the ECU 2 when the engine is in the run state. Even if the ECU 2 receives the run signal s7, it is possible to determine that the ON signal s5 cannot be received (obtained) in the ECU 2 if the ON signal s5 is not received. In this manner, it is possible to prevent the erroneous detection described above. Note that this determination cannot be performed unless the engine 7 is in the run state. In other words, it cannot be performed before the IG switch 5 is turned on, in the operation stop state before the engine 7 is started. In the present invention, it is necessary to obtain the determination result before the IG switch 5 is turned on. Therefore, the determination is performed in advance when the IG switch 5 is in the ON state (the engine 7 is in the run state). And the determination result is stored in a memory 2c of the ECU 2. Specifically, when the determination result is that the ON signal s5 cannot be received (obtained) in the ECU 2, it is sufficient to store that the ON signal s5 cannot be obtained, by setting a flag. In this manner, even before the IG switch 5 is turned on, it is possible to obtain the determination result by checking for the flag (reading the flag (that the ON signal s5 cannot be obtained) from the memory 2c). When a failure that the ON signal s5 cannot be obtained is resolved by a repair, it is sufficient to clear the flag to clear the memory that the ON signal s5 cannot be obtained.

In the vehicle 10, in addition to the engine 7 and the braking force generator 1, in the same manner as those, there is the other system 8 that is started by turning on the IG switch 5 and shut down to be in the operation stop state by turning off the IG switch 5. This other system 8 also receives an IG voltage monitor value s8 as an ON signal, in the same manner as the ON signal s5 in the braking force generator 1. The ECU 2 receives the IG voltage monitor value s8 via a CAN 8a. When the ECU 2 does not receive the ON signal s5 from the on-off detection unit 5a even if the ECU 2 receives the ON signal by the IG voltage monitor value s8 (for example, when the IG voltage monitor value s8 is not 0 V, the IG voltage monitor value as the ON signal s5 from the on-off detection unit 5a is 0 V), it is possible to determine that the ON signal s5 cannot be received (obtained) in the ECU 2. In this manner, it is also possible to prevent the erroneous detection. Note that this determination also cannot be performed unless the engine 7 is in the run state. Therefore, the determination is performed and the determination result is stored in advance in the same manner as described before.

Figure 3:
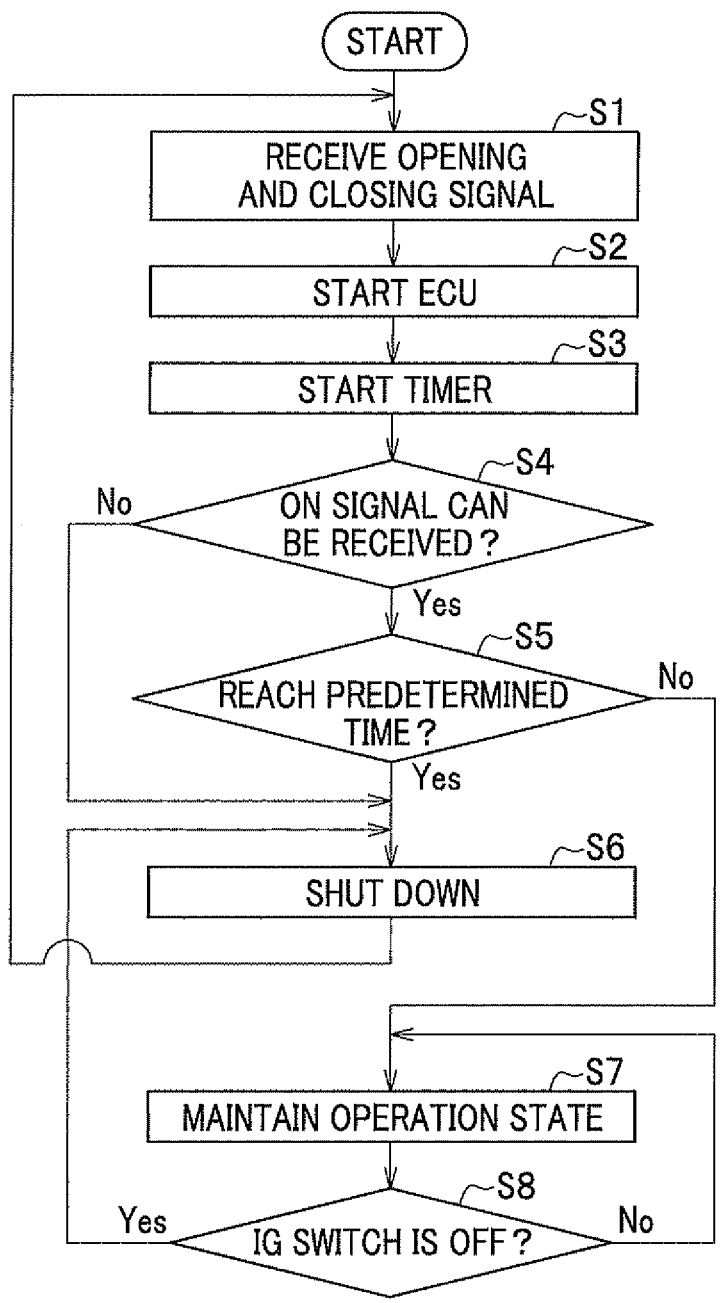
FIG. 3 is a flowchart of a braking force generation method performed by the braking force generator according to the first embodiment of the present invention.

FIG. 3 shows a flowchart of a braking force generation method performed by the braking force generator 1 according to the first embodiment of the present invention.

First, in Step S1, the ECU 2 receives the opening and closing signal s6 corresponding to the opening and closing operation of the opening and closing member 6. Note that the ECU 2 is in the operation stop state until this time.

Next, in Step S2, the ECU 2 starts itself, and further the braking force generator 1 by a trigger of receiving the opening and closing signal s6. The ECU 2 puts the braking force generator 1 in a standby state. The standby state is a state ready for the operation and is included in the operation state. Specifically, the ECU 2 opens the shutoff valve (PFSV) 47 which has been in a closed state, and closes the master cut valves MCV1 and MCV2 which have been in open states. Further, the ECU has the slave cylinder S/C generate a braking force corresponding to the operation amount of the brake pedal 3.

In Step S3, the ECU 2 starts the timer 2b of waiting for receiving the ON signal s5 corresponding to the ON state (ON operation) of the IG switch 5.

In Step S4, the ECU 2 determines whether or not the ON signal s5 corresponding to the ON state of the IG switch 5 can be received (obtained). Specifically, the ECU 2 reads the flag from the memory 2c to check for the flag (that the ON signal s5 cannot be obtained). If there is not the flag, it is determined that the ON signal s5 can be received (obtained) ("Yes" in Step S4), and the flow goes to Step S5. If there is the flag, it is determined that the ON signal s5 cannot be received (obtained) ("No" in Step S4), and the flow goes to Step S6. Further, the ECU 2 shuts down the braking force generator 1 itself.

In Step S5, the ECU 2 determines whether or not a time of waiting for the ON signal s5 measured by the timer 2b reaches a predetermined time (time limit). If the ECU 2 receives the ON signal s5 (the IG switch 5 is turned on) before the measured time reaches the time limit, it is determined that the measured time does not reach the time limit ("No" in Step S5), and the flow goes to Step S7. The ECU 2 maintains the operation state of the braking force generator 1. If the ECU 2 does not receive the ON signal s5 and the measured time reaches the time limit, it is determined that the measured time reaches the time limit ("Yes" in Step S5), and the flow goes to Step S6. Further, the ECU 2 shuts down the braking force generator 1 itself. Specifically, the ECU 2 closes the shutoff valve (PFSV) 47 which has been in an open state, and opens the master cut valves MCV1 and MCV2 which have been in closed states. Further, the ECU 2 has the slave cylinder S/C stop generating the braking force. The door start is substantially canceled by this shutdown. The flow returns to Step S1 after performing the shutdown in Step S6. By this loop, the braking force generator 1 is not (substantially) started by the door start if the ON signal s5 cannot be received, and operative to be started according to the ON state of the IG switch 5. If the braking force generator 1 is started according to the ON state of the IG switch 5, it is not shut down even after the time limit elapses, thereby preventing the braking force from varying.

In Step S8, the ECU 2 determines whether or not the IG switch 5 is turned off. A determination method in Step S4 is utilized for this determination. In this manner, even if the ECU 2 cannot receive the ON signal s5, it is possible to determine whether or not the IG switch 5 is turned off, from the run signal s7 from the engine 7 or the IG voltage monitor value s8 from the other system 8. If it is determined that the IG switch 5 is turned off ("Yes" in Step S8), the flow returns to Step S6, and if it is determined that the IG switch 5 is not turned off ("No" in Step S8), the flow returns to Step S7.

Second Embodiment

Figure 4:
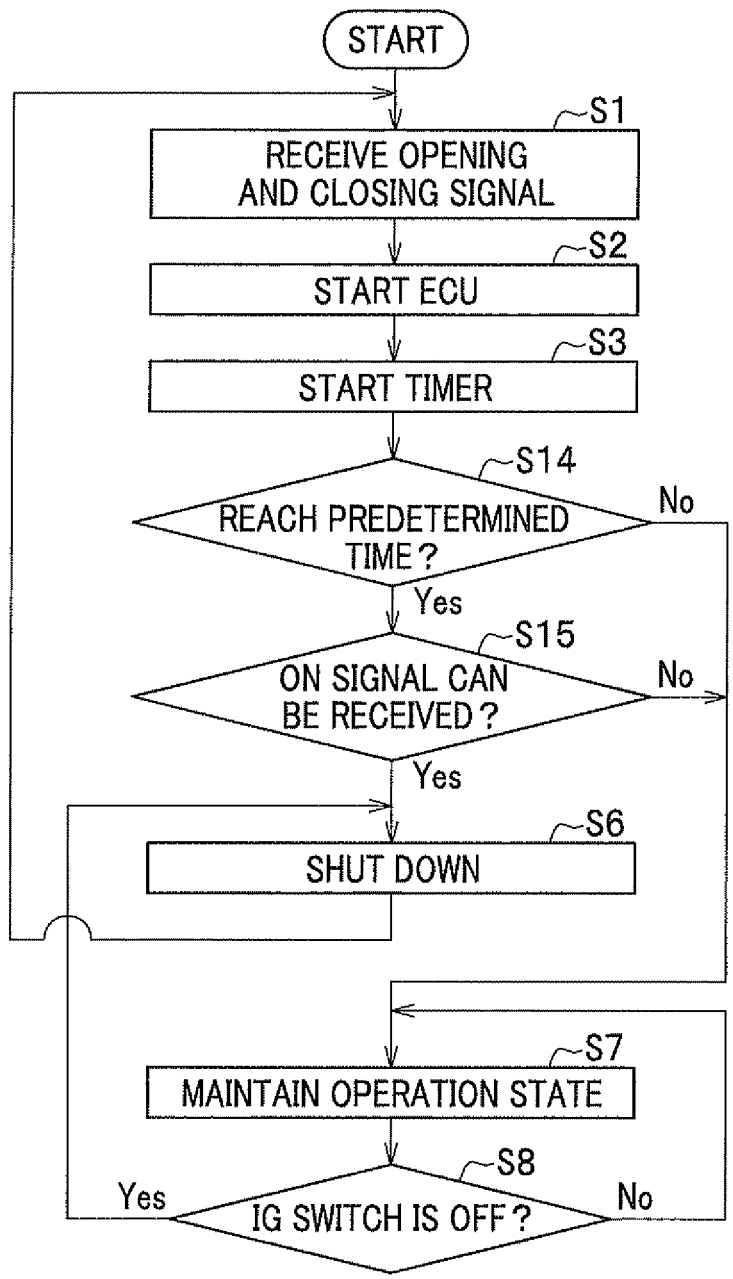
FIG. 4 is a flowchart of a braking force generation method performed by a braking force generator according to a second embodiment of the present invention.

FIG. 4 shows a flowchart of a braking force generation method performed by the braking force generator 1 according to a second embodiment of the present invention. Also in the second embodiment, the braking force generator 1 according to the first embodiment can be used. Since Steps S1 to S3, and S8 in the second embodiment are the same as Steps S1 to S3, and S8 in the first embodiment, the description will be omitted. In the second embodiment, the flow goes to Step 14 subsequent to Step S3.

In Step S14, the ECU 2 determines whether or not a time of waiting for the ON signal s5 measured by the timer 2b reaches a predetermined time (time limit). If the ECU 2 receives the ON signal s5 (the IG switch 5 is turned on) before the measured time reaches the time limit, it is determined that the measured time does not reach the time limit ("No" in Step S14), and the flow goes to Step S7. The ECU 2 maintains the operation state of the braking force generator 1. If the ECU 2 does not receive the ON signal s5 and the measured time reaches the time limit, it is determined that the measured time reaches the time limit ("Yes" in Step S14), and the flow goes to Step S15.

In Step S15, the ECU 2 determines whether or not the ON signal s5 corresponding to the ON state of the IG switch 5 can be received (obtained). Specifically, the ECU 2 reads the flag from the memory 2*c* to check for the flag (that the ON signal s5 cannot be obtained). If there is not the flag, it is determined that the ON signal s5 can be received (obtained) ("Yes" in Step S15), and the flow goes to Step S6. Further, the ECU 2 shuts down the braking force generator 1 itself. This corresponds to a case in which the driver opens and closes the door but does not get on the vehicle 10, and the braking force generator 1 which has been door started is shut down. If there is the flag, it is determined that the ON signal s5 cannot be received (obtained) ("No" in Step S15), and the flow goes to Step S7. Further, the ECU 2 maintains the operation state of the braking force generator 1. This operation state is maintained if it is determined that the ON state of the IG switch 5 cannot be received (obtained) by the disconnection of the signal line or the like ("No" in Step S15), even if the measured time from the door start (Step S2) reaches the time limit ("Yes" in Step S14). Therefore, it is possible to prevent the braking force from a variation caused by the shutdown.

REFERENCE SIGNS LIST

1: braking force generator (ESB system)
2: ECU
2*a*: control unit (conditional stop unit)
2*b*: timer
3: brake pedal
5: ignition switch (IG switch)
5*a*: on-off detection unit
6: opening and closing member (door)
6*a*: opening and closing detection unit (door switch)
7: engine
7*a*: engine run detection unit
8: other system
8*a*: CAN
10: vehicle
M/C: master cylinder
MCV1, MCV2: master cut valve (shutoff valve)
S/S: stroke simulator
S/C: slave cylinder (hydraulic pressure generation unit)

The invention claimed is:

1. A braking force generator comprising:
a hydraulic pressure generation unit that becomes in an operation state according to an ON state of an ignition switch of a vehicle or an opening and closing operation of an opening and closing member of the vehicle, and generates a braking force according to an electrical signal based on an operation amount of a driver; and
a conditional stop unit that puts the hydraulic pressure generation unit in an operation stop state if an OFF state of the ignition switch continues for a predetermined time after the hydraulic pressure generation unit becomes in the operation state according to the opening and closing operation, wherein
the conditional stop unit puts the hydraulic pressure generation unit in the operation stop state if it is determined that the ON state cannot be obtained, even if the opening and closing operation is obtained.

2. A braking force generator comprising:
a hydraulic pressure generation unit that becomes in an operation state according to an ON state of an ignition switch of a vehicle or an opening and closing operation of an opening and closing member of the vehicle, and generates a braking force according to an electrical signal based on an operation amount of a driver; and
a conditional stop unit that puts the hydraulic pressure generation unit in an operation stop state if an OFF state of the ignition switch continues for a predetermined time after the hydraulic pressure generation unit becomes in the operation state according to the opening and closing operation, wherein
the conditional stop unit continues the operation state of the hydraulic pressure generation unit if it is determined that the ON state cannot be obtained, even if the OFF state of the ignition switch continues for a predetermined time after the hydraulic pressure generation unit becomes in the operation state according to the opening and closing operation.

* * * * *